United States Patent
Rosenqvist et al.

(10) Patent No.: US 8,315,339 B2
(45) Date of Patent: Nov. 20, 2012

(54) CHANNEL ESTIMATION

(75) Inventors: Anders Rosenqvist, Lund (SE); Johan Nilsson, Höllviken (SE); Andres Reial, Malmö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 843 days.

(21) Appl. No.: 12/435,539

(22) Filed: May 5, 2009

(65) Prior Publication Data

US 2010/0284443 A1    Nov. 11, 2010

(51) Int. Cl.
*H04L 27/00* (2006.01)

(52) U.S. Cl. ........................................ 375/326

(58) Field of Classification Search ............... 375/147, 375/148, 260, 326; 370/342
See application file for complete search history.

(56) References Cited

U.S. PATENT DOCUMENTS

| | | | |
|---|---|---|---|
| 7,715,507 B2 * | 5/2010 | Lee | 375/346 |
| 2006/0227749 A1 | 10/2006 | Zhang et al. | |
| 2007/0286124 A1 | 12/2007 | Grant et al. | |
| 2008/0159451 A1 | 7/2008 | Majonen | |
| 2008/0192720 A1 | 8/2008 | Frederiksen et al. | |
| 2009/0080506 A1 | 3/2009 | Banna et al. | |

FOREIGN PATENT DOCUMENTS

| | | |
|---|---|---|
| EP | 1898544 | 3/2008 |
| WO | 2006132593 | 12/2006 |
| WO | 2007022628 | 3/2007 |
| WO | 2008147158 | 12/2008 |

OTHER PUBLICATIONS

3rd Generation Partnership Project. 3GPP TS 25.212, V7.10.0 (Mar. 2009). 3rd Generation Partnership Project; Technical Specification Group Radio Access Network; Multiplexing and channel coding (FDD) (Release 7). Mar. 2009.

Batariere, M. D. et al. "Low-Complexity Technique to Increase Capacity of Mobile Broadband Systems." 2004 IEEE 59th Vehicular Technology Conference (VTC 2004-Spring), Milan, Italy, May 17-19, 2004, pp. 1939-1943.

* cited by examiner

*Primary Examiner* — Kevin Kim
(74) *Attorney, Agent, or Firm* — Coats & Bennett, P.L.L.C.

(57) ABSTRACT

A user terminal is configured to generate supplemental pilot symbols from data symbols transmitted to other user terminals meeting a predetermined reliability criterion. The supplemental pilot symbols can be used for channel estimation, covariance estimation, CQI estimation, or other purposes.

36 Claims, 6 Drawing Sheets

CHANNEL ESTIMATION

BACKGROUND

The present invention relates generally to estimation of channel conditions in wireless communication networks and, more particularly, to a method and apparatus for generating supplemental pilot symbols from data symbols to enable more accurate estimation of channel conditions.

In mobile broadband communication systems, a plurality of user terminals may share an uplink and/or downlink channel. A scheduler at the base station determines which user terminals shall have use of the channel at any given time. For example, the shared channel may be divided in the time domain into consecutive time periods. For any given time period, a scheduler determines which user terminals shall be allowed to transmit or receive data on the shared channel. The channel could also be divided in the frequency and code domains so that more than one user terminal can use the channel in any given time period.

One example of a shared communication channel is the High Speed Downlink Shared Channel (HS-DSCH) for High Speed Downlink Packet Access (HSDPA) in Wideband Code Division Multiple Access (WCDMA) systems. A user terminal with an HSDPA connection estimates the channel based on pilot symbols transmitted by the serving base station on the Common Pilot Channel (CPICH). The channel estimates are used to generate a Channel Quality Indication (CQI) that is reported to the base station for scheduling purposes. The base station uses the CQI reported by the user terminals for scheduling and for selecting the coding and modulation to use for downlink transmissions. The user terminals may also use channel estimates to compute impairment covariances and combining weights, which are used in a RAKE receiver to combine different delayed versions of the received signal to produce symbol estimates. Chip equalizer receivers may also use the pilot symbols to adapt filter coefficients in channel tracking filters.

Channel estimates produced based solely on the CPICH can sometimes be noisy. The main difficulty is that there are only a limited number of pilot symbols per time slot (10 for HSDPA) available for channel estimation and/or covariance estimation. When the estimates are noisy, the user terminal may lower the reported CQI, or the base station may use a value lower than reported, in order to maintain a desired block error rate (BLER) and avoid excessive retransmissions. In both instances, there is a corresponding reduction in system throughput. Increasing the number of pilot symbols would improve the reliability of channel estimates, and therefore result in more accurate CQI reports and hence increased system throughput. Additionally, the user terminal would gain from improved interference suppression. However, increasing the number of pilot symbols increases the overhead and reduces the resources available to carry user data.

SUMMARY

The present invention relates to a method implemented by a user terminal for generating supplemental pilot symbols for channel estimation and other purposes from unknown data symbols transmitted on a control channel or traffic channel to other user terminals. The general idea is to demodulate unknown data symbols transmitted to other user terminals in the same cell and to use demodulated data symbols meeting predetermined reliability criteria to generate supplemental pilot symbols. More specifically, the user terminal demodulates a received signal that is intended for one or more other user terminals in the same cell and computes a reliability metric for the demodulated symbols. If the demodulated data symbols meet a predetermined reliability criterion, the demodulated symbols are used to generate supplemental pilot symbols.

One exemplary embodiment of the invention comprises a method implemented by a first user terminal for generating supplemental pilot symbols. The method comprises demodulating a received signal containing unknown data symbols transmitted to at least one other user terminal to generate demodulated data symbols, determining a reliability metric for the demodulated data symbols, and generating a set of supplemental pilot symbols based on the demodulated data symbols if the reliability metric meets a predetermined reliability threshold.

Another exemplary embodiment of the invention comprises a receiver for a user terminal configured to generate supplemental pilot symbols from data symbols transmitted to other user terminals. The receiver comprises a demodulator to demodulate a received signal transmitted to at least one other user terminal to generate demodulated data symbols, a reliability metric estimator for determining a reliability metric for the demodulated data symbols, and a pilot symbol generator to generate a set of supplemental pilot symbols from the demodulated data symbols having a reliability metric that meets a predetermined reliability threshold.

DETAILED DESCRIPTION

Figure 1:
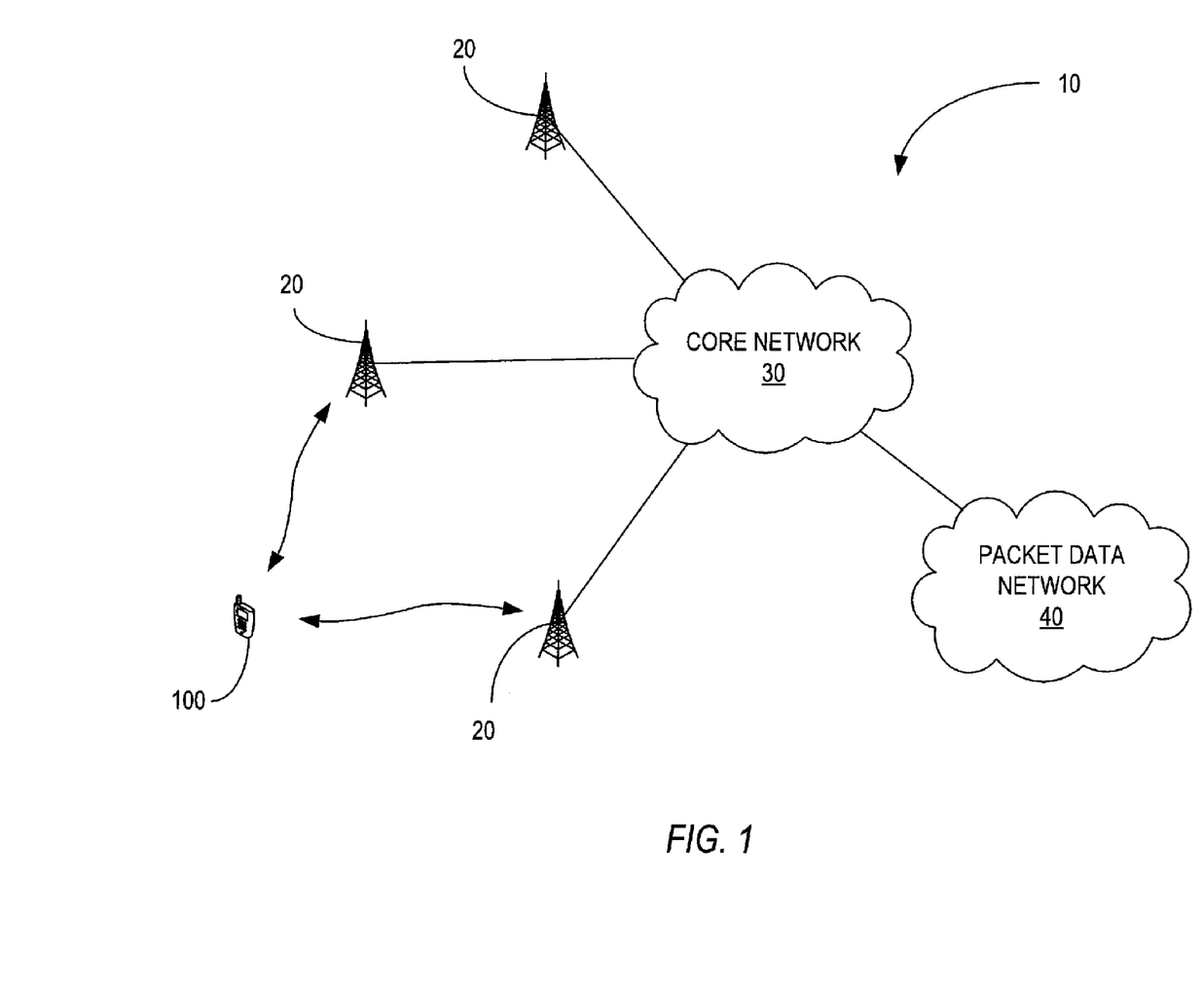
FIG. 1 illustrates and exemplary wireless communication network.

FIG. 1 illustrates an exemplary wireless communication network 10 for providing mobile broadband services to one or more user terminals 100. The term user terminal as used herein refers to any portable communication device having the ability to connect wirelessly to a communication network 10. The term user terminal includes, without limitation, cellular phones, smart phones, personal digital assistants, laptop computers, and handheld computers. Wireless communication network 10 includes a plurality of base stations 20 that provide radio coverage within respective cells of the wireless communication network 10 and access to a core network 30. The core network 30, in turn, connects to one or more external packet data networks 40, such as the Internet, and is responsible for routing data between the external packet data networks 40 and the base stations 20 serving the user terminals 100.

Conventionally, the base stations 20 in each cell of the mobile communication network 10 transmit a pilot signal, which enables the user terminals 100 to estimate the channel and to generate a Channel Quality Indication (CQI). As will be described in greater detail below, the CQI is typically reported to base station 20 and used by the base station 20 for scheduling the user terminals 100 sharing a communication channel. Depending on the type of receiver in the user terminal 100, a user terminal 100 may also use the pilot symbols to compute combining weights for combining different versions of the received signal, to generate impairment covariance estimates for interference suppression, and/or to adapt channel tracking filters.

According to embodiments of the present invention, channel estimates, CQI estimates, impairment covariance estimates, and/or filter coefficient estimates can be improved by providing supplemental pilot symbols to improve the accuracy of such estimates. More specifically, the user terminals 100 incorporating the present invention may generate the supplemental pilot symbols from unknown data symbols transmitted by the base station 20 to other user terminals 100 in the same cell. The unknown data symbols may, in some embodiments, comprise data symbols transmitted over a traffic channel that is intended for other user terminals. The unknown data symbols may also comprise control channel symbols transmitted to multiple user terminals over a common control channel.

As an example, an embodiment of the present invention will be described in the context of a Wideband Code Division Multiple Access (WCDMA) system. Those skilled in the art will recognize that the principles described herein can be applied to mobile communication networks based on other standards, e.g., the WIMAX (IEEE 802.16) standard, and the 3GPP standard known as Long Term Evolution (LTE).

WCDMA systems include a High Speed Downlink Packet Access (HSDPA) mode for packet data services. The main purpose of HSDPA is to increase data throughput using enhancements such as fast scheduling, fast link adaptation, physical layer automatic repeat request (HARQ), smaller packet size, and multi-code transmission. HSDPA takes advantage of the bursty nature of packet data to share the available radio resources among a plurality of users and thereby make more efficient use of those resources.

For downlink transmissions, HSDPA uses a shared channel called the High Speed Downlink Shared Channel (HS-DSCH). The HS-DSCH is a time and code multiplexed channel shared by a plurality of user terminals 100. The HS-DSCH is divided into 2 ms time intervals referred to as Transmission Time Intervals (TTIs). A TTI is the basic unit of time used to schedule user terminals 100 on the HS-DSCH. During any given TTI, base station 20 allocates up to 15 channelization codes for use on the HS-DSCH. A scheduler at the base station 20 determines which user terminals 100 to serve in each TTI based on factors such as the channel conditions (e.g., CQI) reported by each user terminal 100, the amount of data pending in the buffer for each user terminal 100, the average throughput to each user terminal 100, and any Quality of Service (QoS) guarantees. The scheduling algorithm is typically determined by the network operator.

The identity of the user terminals 100 scheduled to receive data in a given TTI, and the transmission format, are transmitted to the user terminals 100 in a scheduling message transmitted on a shared downlink control channel, referred to in the WCDMA standard as the High Speed Shared Control Channel (HS-SCCH). The HS-SCCH is a fixed rate channel (60 kbps, spreading factor=128) used to transmit downlink signaling before the start of a corresponding TTI. The HS-SCCH is divided into two parts. Part 1 carries critical information needed by the user terminal 100 to begin demodulation of the HS-DSCH. Part 2 carries less time-critical information, such as a Cyclic Redundancy Check (CRC), transport block format, and HARQ process information. The base station 20 transmits the HS-SCCH two timeslots before the start of the corresponding TTI. Part 1 of the HS-SCCH is transmitted with a user terminal specific mask that identifies the user terminal 100 scheduled in the corresponding TTI.

A user terminal 100 with an HSDPA connection estimates the channel based on pilot symbols transmitted by the serving base station 20 on the Common Pilot Channel (CPICH). The channel estimates, as noted above, are used to generate a channel quality indication (CQI) that is reported to the base station 20 for scheduling purposes. The user terminal 100 may also use the channel estimates to compute impairment covariances and combining weights, which are used to combine different delayed versions of the received signal to produce symbol estimates. In WCDMA systems, there are only a limited number of pilot symbols per slot (10 for HSDPA) for channel estimation. Thus, the channel and covariance estimates produced based solely on the CPICH can sometimes be noisy.

Figure 2:
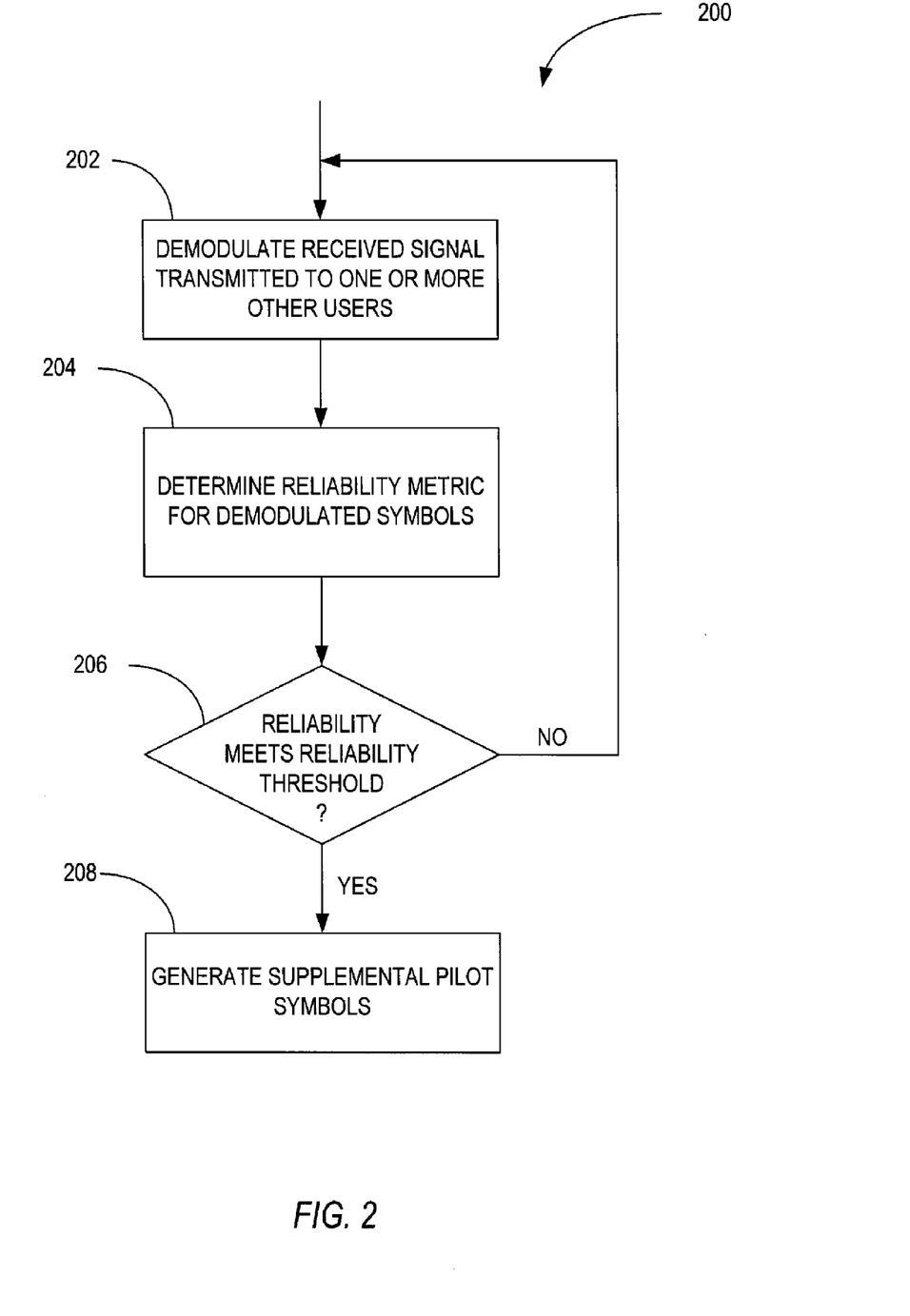
FIG. 2 illustrates an exemplary method for generating supplemental pilot symbols from data symbols.

According to the present invention, unknown data symbols transmitted to other users in the same cell can be used to generate supplemental pilot symbols to improve accuracy in channel estimation. FIG. 2 illustrates an exemplary method 200 implemented by a user terminal 100 to generate supplemental pilot symbols from data symbols transmitted to other users in the same cell. The general idea is to demodulate unknown data symbols transmitted to other users and to use demodulated data symbols meeting predetermined reliability criteria to generate supplemental pilot symbols. The user terminal 100 demodulates a received signal that is intended for one or more other user terminals 100 in the same cell (block 202). The received signal may be a traffic channel signal transmitted to other user terminals over the HS-DSCH. Alternatively, the received signal may be a control channel signal transmitted to one or more user terminals over the HS-SCCH. The demodulated symbols are then tested to determine if they meet predetermined reliability criteria. More specifically, the user terminal 100 determines a reliability metric for the demodulated data symbols (block 204) and compares the reliability metric with a reliability threshold (block 206). As an example, the user terminal 100 may compare the signal to interference plus noise ratio (SINR) of the demodulated symbols to a predetermined SINR threshold. If the reliability metric is met, the demodulated symbols are used to generate supplemental pilot symbols (block 208).

The SINR estimate for the demodulated symbols can be determined in several different ways. First, the user terminal 100 may use the demodulated symbols for the other user to compute the SINR estimate in a conventional fashion. In other embodiments, the SINR estimate for signals transmitted to the user terminal on the HS-DSCH (the user terminal's own SINR) can be used as an approximation of the SINR for the demodulated symbols based on the assumption that the power ratio of the CPICH and HS-DSCH is the same for all users. If the user terminal's own SINR is used as an approximation of the SINR for the demodulated data symbols, the user terminal 100 may compensate the SINR estimate for the possibility that the power ratio for the other user may be different. A compensation factor could be determined, for example, by estimating the power of only one "finger" out of the despreaders (when set up for this user/channel) and compare it to the corresponding estimate (of the same finger) for CPICH.

In some embodiments, the supplemental pilot symbols are generated by converting soft symbol values produced by the demodulator into hard values. In other embodiments, the soft values may be decoded and the decoded data bits are mapped back to corresponding modulation symbols. The regenerated modulation symbols can then be used as supplemental pilot symbols. The supplemental pilot symbols may be used to estimate the channel coefficients of the downlink channel and to compute a CQI for scheduling purposes. Also, the supplemental pilot symbols can be used to estimate the impairment covariance of the channel, to compute combining weights for a RAKE receiver, or to compute filter weights for a chip equalizer receiver.

In one embodiment, the user terminal 100 uses the SINR of the demodulated symbols as a reliability metric for comparison to a predetermined SINR threshold. The SINR threshold may be determined as a function of the modulation and code rate of the transmitted symbols. Transmission with a high code rate is generally invoked when the symbol SINR for the targeted user is high and typically leads to reliable raw symbol decisions at the targeted user terminal 100. Similarly, a user terminal 100 receiving symbols targeted to other users can use the received symbols as supplemental pilot symbols if its own SINR for those symbols is sufficiently high. The SINR threshold for different modulations and code rates can be stored in a look-up table in a memory of the user terminal 100.

Table 1 below illustrates an exemplary look-up table for embodiments where the received data sequence is decoded. The table is indexed by modulation and code rate. The symbols within the table denote the threshold SINR for corresponding modulation and code rate. If the instantaneous SINR of the user terminal 100 meets the SINR threshold, the demodulated symbols may be considered sufficiently reliable to use as supplemental pilot symbols. In the embodiment where hard decisions are applied to the demodulated symbols, the code rate dimension is removed.

TABLE 1

SINR Threshold

| Code Rate | Modulation | | |
|---|---|---|---|
| | QPSK | 16QAM | 64QAM |
| 0.1 | a | b | c |
| 0.2 | d | e | f |
| ... | ... | ... | ... |
| 0.9 | u | v | w |
| 1.0 | x | y | z |

For HSDPA, information about the modulation and code rate for transmissions on the HS-DSCH is transmitted to the user terminals 100 on the HS-SCCH. As noted above, the HS-SCCH is divided into two parts. Information about the transport format is transmitted in Part 1 of the HS-SCCH, which is transmitted with a user terminal specific mask that identifies the user terminal 100 scheduled on the HS-DSCH in the corresponding TTI. Part 2 contains a CRC field which is also masked, but the rest of the coding and multiplexing of Part 2 is user terminal independent. When a given user terminal 100 is scheduled to receive data on the HS-DSCH, its own user terminal ID (UID) is used to mask Part 1 of the HS-SCCH and the CRC in Part 2. In this case, Part 1 may be decoded in a conventional fashion. However, user terminals 100 typically do not have knowledge of the UIDs for other user terminals. Therefore, when a given user terminal 100 is not currently scheduled, it needs to ascertain the UID for the scheduled user terminal 100 in order to decode Part 1 of the HS-SCCH and retrieve the modulation and code rate information.

Figure 3:
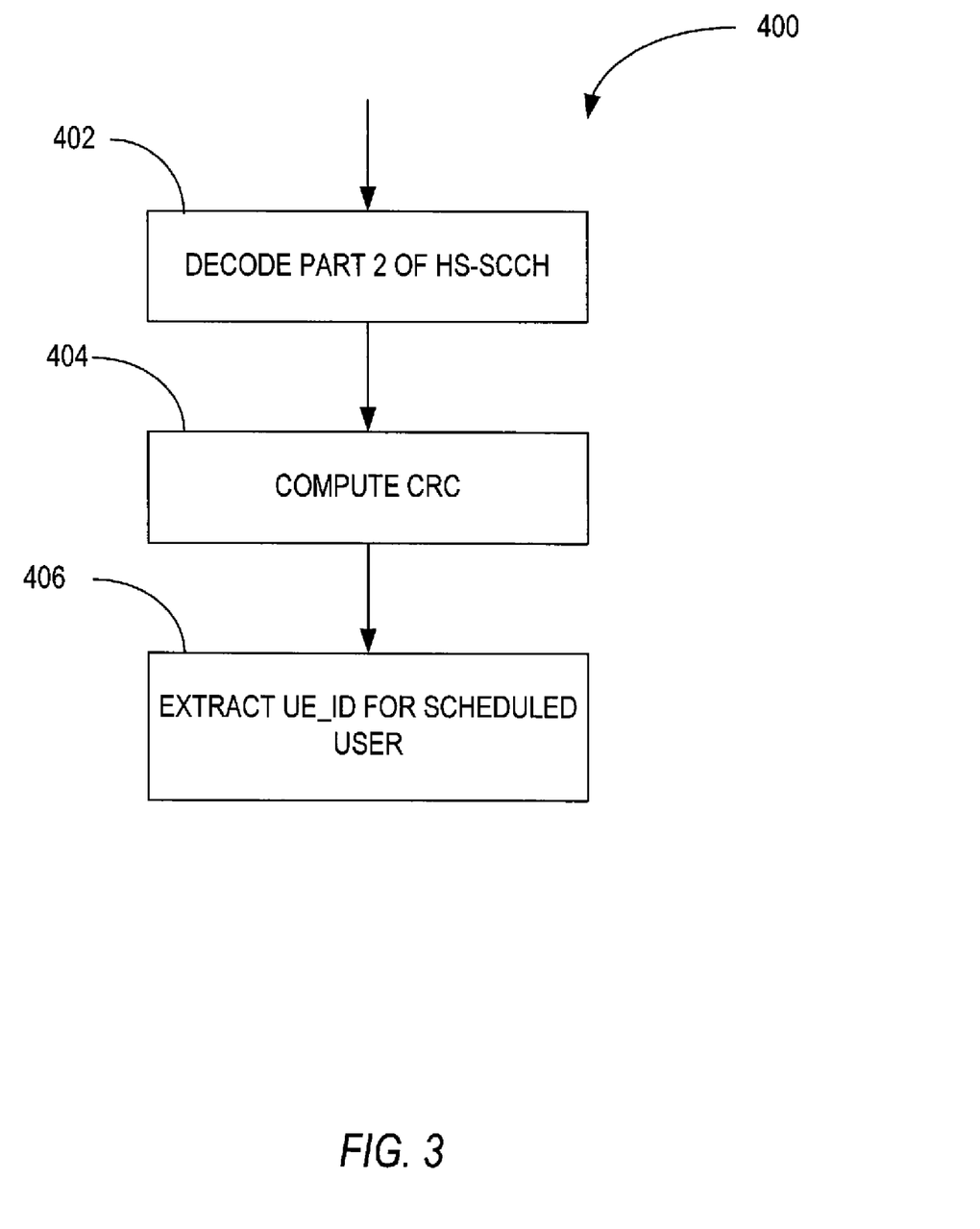
FIG. 3 illustrates an exemplary method for decoding Part 1 of the HS-SCCH in WCDMA systems when a user terminal is not currently scheduled to receive data on the HS-DSCH.

FIG. 3 illustrates an exemplary method 400 used in some embodiments of the invention to demask and decode Part 1 of the HS-SCCH when the user terminal 100 is not currently scheduled to receive data on the HS-DSCH. First, the user terminal 100 decodes Part 2 of the HS-SCCH to obtain a decoded sequence comprised of two parts denoted herein as $X_2$ and $MC_2$ (block 402). $X_2$ is the control data transmitted in Part 2 of the HS-SCCH by the base station 20. $MC_2$ is the masked CRC, which has been masked with the scheduled UID. It is presumed that the demodulated symbols have been correctly received, so that there are no errors. Based on this assumption, the non-scheduled user terminal 100 can compute the expected CRC given the received control data $X_2$ (block 404). $MC_2$ can then be demasked by an XOR operation using the expected CRC and $MC_2$ as operands. The XOR operation yields the presumed UID of the scheduled user terminal 100 (block 406). The computed UID for the scheduled user can then be used to demask and decode Part 1 of the HS-SCCH to retrieve the modulation and code allocation information.

In some embodiments of the invention, a user terminal 100 may create a list of active UIDs by continuously monitoring the HS-SCCH and decoding Part 2 of the HS-SCCH even when it is not scheduled. If an unknown UID is discovered by decoding Part 2 of the HS-SCCH, it may be added to the list of currently-active UIDs stored in memory of the user terminal 100. The probability of detecting and adding incorrect UIDs to the list may be reduced by using the convolutional decoder output quality metric to determine whether the Part 2 decoding was successful. If the decoder quality metric is below a threshold, the decoding result may be deemed unreliable and the detected UID is discarded. The list may be purged to eliminate inactive or erroneously decoded UIDs. For example, the UIDs stored in the list may be assigned a maximum lifetime. If the same UID is not detected during the specified time limit, it may be removed from the list.

In some embodiments of the invention, a non-scheduled user terminal 100 may decode Part 2 of the HS-SCCH and determine the UID of the scheduled user terminal 100 as previously described by demasking the CRC in Part 2 of the HS-SCCH. The user terminal 100 may then return to the Part 1 transmitted two slots earlier in the same TTI and use the knowledge of the UID to extract the modulation and code allocation information. This approach may require that some signals be buffered or stored while Part 2 decoding is performed. Part 1 of the HS-SCCH may be demodulated and the demodulated symbols stored until Part 2 decoding is complete. Also, it may be necessary to store signals transmitted to the scheduled user terminal 100 on the HS-DSCH. Because the modulation of the data transmission on the HS-DSCH is not known, the received chip sequence before dispreading and demodulation may be stored. In some embodiments, the UE may first attempt to decode Part 1 of the HS-SCCH using the UIDs in its list of active UIDs, and resort to data storage and Part 2 information retrieval only if decoding of Part 1 of the HS-SCCH with the known UIDs fails.

The exemplary embodiment described above uses data symbols transmitted to other users as supplemental pilot symbols. Those skilled in the art will appreciate that other downlink traffic in the cell may also be utilized to generate supplemental pilot symbols. For example, data symbols transmitted on control channels such as the HS-SCCH, E-AGCH, E-HICH, E-RGCH, S-CCPCH, may be used to generate the supplemental pilot symbols. Also, data symbols transmitted on the downlink physical channel in Release '99 of WCDMA could be used. All these channels use QPSK modulation and their code rates are known or may be easily determined. The symbol SINR may be determined as known in the art and the SINR threshold may be determined using the look-up table approach as described above.

In some embodiments of the invention, the demodulated data symbols deemed to be sufficiently reliable can be used as supplemental pilot symbols without decoding the data symbols. If the demodulation process yields soft symbol values, the soft symbol values may be converted to hard values, which can be used as supplemental pilot symbols.

The method of recovering transport format and modulation information for other users according to the invention may also be used in other wireless communications systems, e.g. the LTE system. In LTE, the control information is transmitted on the PDCCH that, like HS-SCCH Part 2, consists of a message part and a CRC part. The control message X is scrambled with a user-specific sequence S, yielding SX. The CRC value C is computed and masked with a user-specific mask M, yielding MC. The sequence [SX MC] is encoded and transmitted. The receiver then decodes the received sequence, extracts SX and can reproduce the expected CRC field. As before, the expected CRC and the received MC field are XOR-ed and the masking sequence is retrieved. Given the mask, the corresponding scrambling sequence S may be derived. Finally, the message field is descrambled and the control message with transport format information is recovered.

In other embodiments of the invention, the demodulated data symbols may be decoded to produce a decoded bit stream. The supplemental pilot symbols may be generated from the decoded bit stream by re-encoding the bit stream and mapping the coded bits to corresponding modulation symbols. The generation of pilot symbols from decoded bits will, in general, be more reliable than pilot symbols generated by demodulation alone. The trade-off is increased delay, since several data sources need to be decoded during the same processing interval. The amount of such delay can be reduced by using a second reliability metric to select data blocks that can likely be decoded in a few decoding iterations.

Using decoded bits, rather than demodulated symbols, to generate the supplemental pilot symbols may be attractive when the user terminal is in the idle mode. When the user terminal is in the idle mode, it is not concerned with demodulating and decoding its own data, and thus has more processing time available for decoding the data streams intended for other users to generate the supplemental pilot symbols. This approach may also be used in a persistent scheduling or CPC mode, where the user terminal is allocated downlink resources on a periodic basis and the user terminal wakes up at regular intervals to receive the downlink data.

Figure 4:
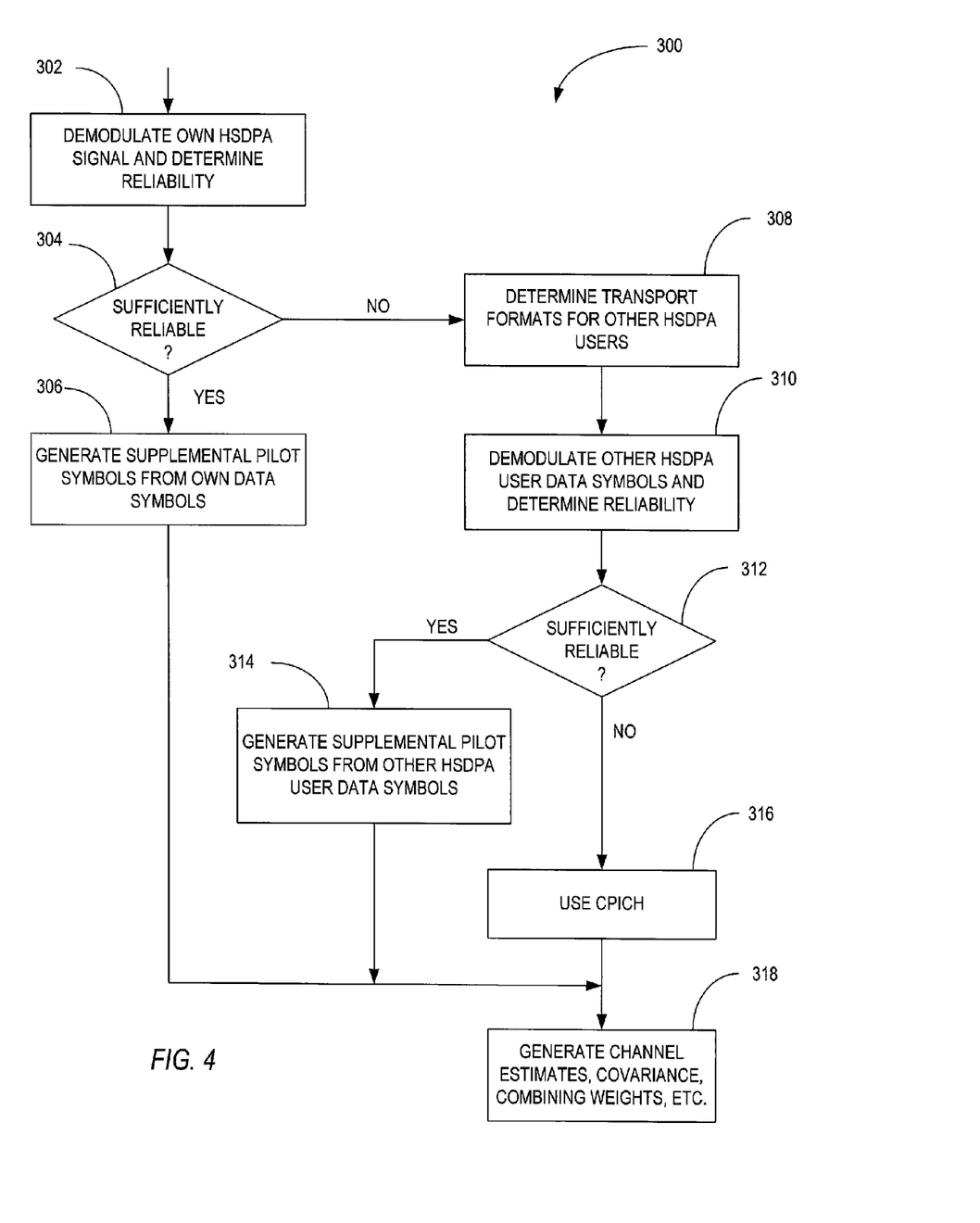
FIG. 4 illustrates an exemplary method for generating supplemental pilot symbols from data symbols in a WCDMA system.

FIG. 4 illustrates an exemplary method 300 implemented by a user terminal 100 in a WCDMA communication system for generating supplemental pilot symbols. In this embodiment, user terminal 100 may use data symbols transmitted to itself and/or other user terminals 100 on the HS-DSCH to generate the supplemental pilot symbols. Because it is easier for the user terminal 100 to demodulate its own HSDPA signals, the user terminal 100 uses its own data symbols as supplemental pilot symbols if they are sufficiently reliable. If its own data symbols are not sufficiently reliable, the user terminal 100 will use data symbols transmitted to other users if those data symbols are sufficiently reliable.

The method 300 begins when the user terminal 100 receives data symbols on the HSDPA. The user terminal 100 demodulates its own HSDPA signal and determines a reliability metric for the demodulated symbols (block 302). User terminal 100 compares the reliability metric to a reliability threshold as previously described to determine whether the demodulated symbols are sufficiently reliable (block 304). If so, user terminal 100 uses its own data symbols as supplemental pilot symbols 306. If not, the user terminal 100 determines the transport formats for other HSDPA users (block 308). The transport format for other users may be determined as shown in FIG. 3. Once the transport format is known, the user terminal 100 demodulates the signals transmitted to other HSDPA users and determines the reliability of the demodulated symbols (block 310). User terminal 100 compares the reliability metrics for the other user symbols to a reliability threshold to determine if the other user symbols are sufficiently reliable (block 312). If so, the user terminal 100 uses the data symbols intended for other HSDPA users as supplemental pilot symbols (block 314). If the other user data symbols are not sufficiently reliable, the user terminal 100 uses the pilot symbols transmitted on the CPICH (block 316). The regular pilot symbols and/or supplemental pilot symbols can be used to generate channel estimates CQI estimates, covariant estimates, combining weights, or filter weight estimates (block 318).

Figure 5A:
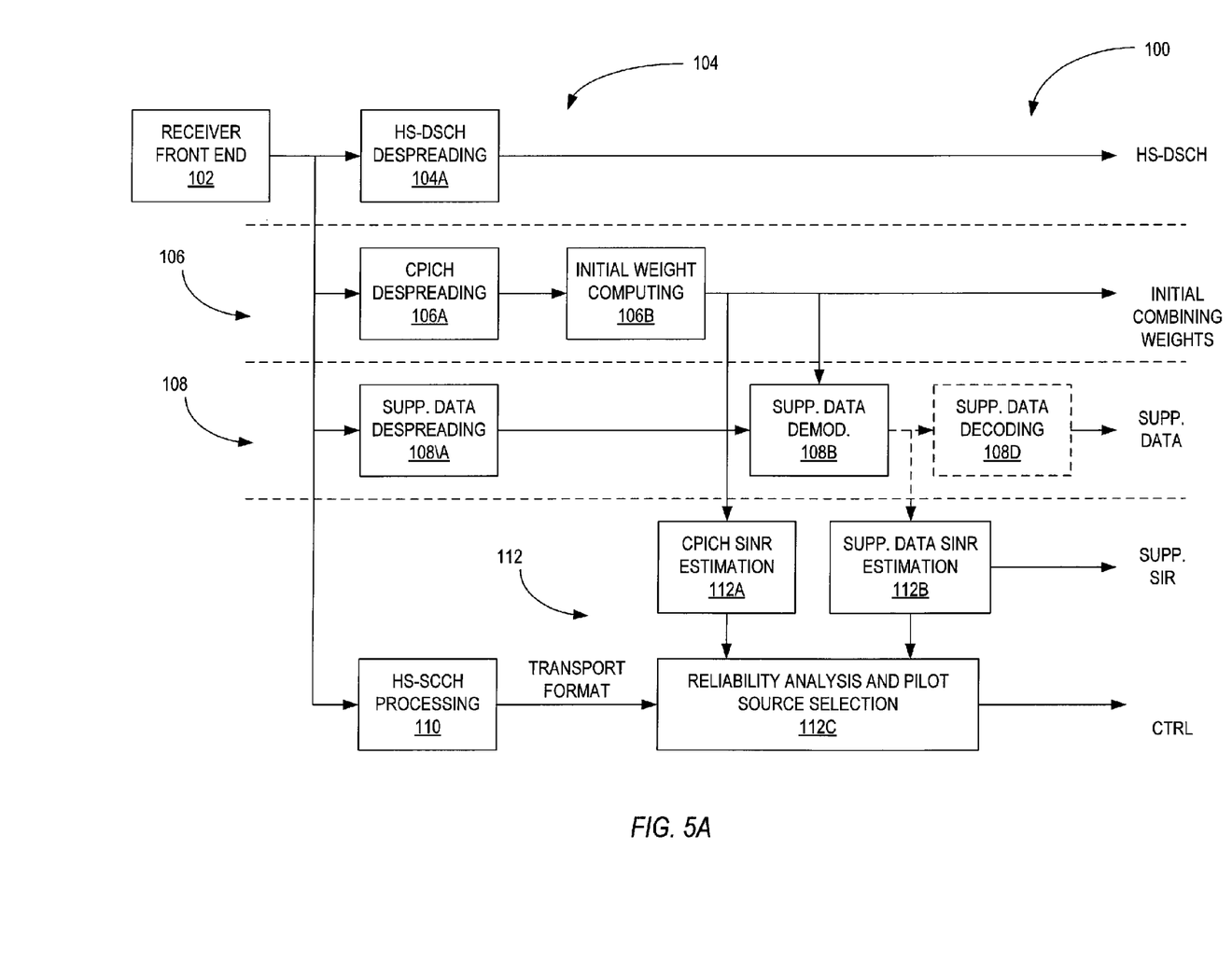
FIGS. 5A and 5B illustrate an exemplary user terminal for a WCDMA system capable of generating supplemental pilot symbols from unknown data symbols transmitted to other users.
Figure 5B:
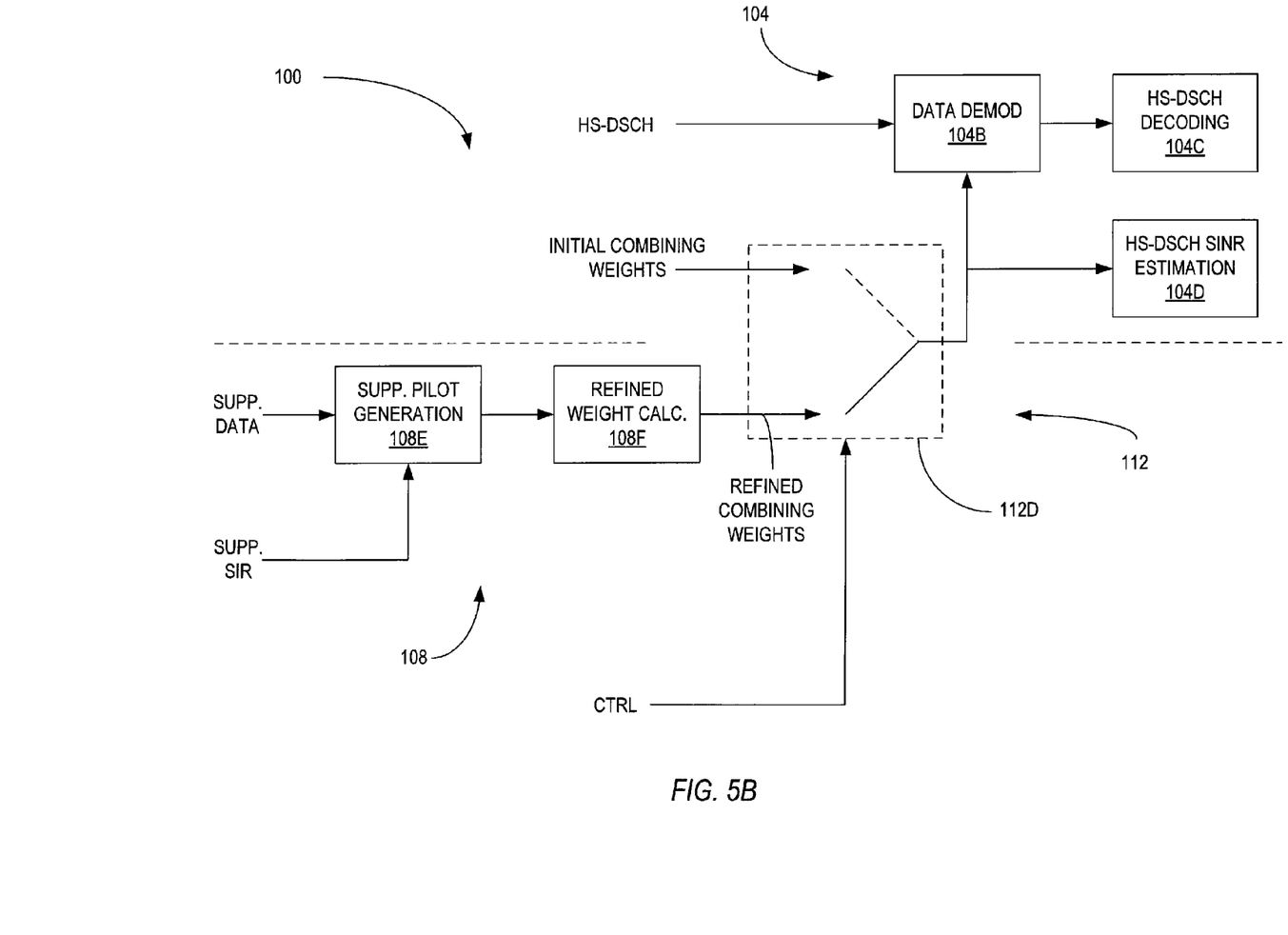

FIGS. 5A and 5B illustrates an exemplary user terminal 100 according to one exemplary embodiment. The user terminal 100 includes a receiver front end 102, HS-DSCH processing unit 104, primary pilot symbol processing unit 106, supplemental pilot symbol processing unit 108, HS-SCCH processing unit 110, and control unit 112. Receiver front end 102 is coupled to an antenna (not shown) to receive signals transmitted from a base station 20. The receiver front end 102 amplifies and filters the received signal, downconverts the received signal to baseband frequency, and samples the received signal to generate a digital baseband signal. Signals received on the HS-DSCH are input to HS-DSCH processing unit 104. The pilot symbols received on the common pilot channel (CPICH) are input to the primary pilot symbol processing unit 106. Data selected for use as supplemental pilot symbols is input to the supplemental pilot symbol processing unit 108. Signals received on the HS-SCCH are input to the HS-SCCH processing unit 110.

The HS-DSCH processing unit 104 comprises a despreading unit 104a, combining unit 104b, decoder 104c, and HS-DSCH SINR estimation unit 104d. The HS-DSCH despreading unit 104a despreads signals transmitted to the user terminal on the HS-DSCH to generate despread HS-DSCH symbols. Demodulation unit 104b demodulates the despread HS-DSCH symbols using combining weights calculated based on the primary pilot symbols, supplemental pilot symbols, or both to generate demodulated HS-DSCH symbols that are passed to the HS-DSCH decoder 104c for decoding. HS-DSCH SIR estimation unit 104d computes an estimate of the SINR for the HS-DSCH based on the selected combining weights.

The primary pilot symbol processing unit 106 comprises a CPICH despreading unit 106a and initial weight combining unit 106b. The CPICH despreading unit 106a despreads the pilot signal received on the CPICH and the despread pilot symbols are used by the initial weight calculation unit 106b to calculate combining weights that may be used by the HS-DSCH combining unit 104b.

The supplemental pilot symbol processing unit 108 comprises a supplemental data despreading unit 108a, supplemental data demodulation unit 108b, supplemental data decoding unit 108d, supplemental pilot generation unit 108e, and refined weight calculation unit 108f. The supplemental data despreading unit 108a despreads the transmitted symbols that are selected for use as the supplemental pilot symbols, which may be either control data or user data transmitted to another user. The supplemental data demodulation unit 108b combines the despread data symbols, which may be optionally decoded by the supplemental data decoding unit 108d. The supplemental pilot generation unit 108e generates supplemental pilot symbols from the demodulated symbols output by the supplemental data combining unit 108b or, alternatively, the decoded data output by the supplemental data decoding unit 108d. The refined weight calculation unit 108f computes refined combining weights that may be used by the HS-DSCH combining unit 104b.

The HS-SCCH processing unit 110 demodulates and decodes the HS-SCCH to determine the transport format of the signals transmitted on the HS-DSCH, which is provided to the control unit 112. The control unit includes a CPICH SIR estimation unit 112a, a supplemental pilot symbol SINR estimation unit 112b, a reliability analysis and pilot source selection unit 112c, and a selection circuit 112d. The CPICH SINR estimation unit 112a and a supplemental pilot symbol SINR estimation unit 112b provide SINR estimates to the reliability analysis and pilot source selection unit 112c, which selects either the primary pilot symbols or secondary pilot symbols to use for computing combining weights used by the HS-DSCH demodulation unit 104b. The CPICH SINR estimation unit 112a computes SINR estimates based on the pilot symbols received on the CPICH. The supplemental data SIR estimation unit 112b may compute SINR estimates based either on the demodulated data symbols selected as supplemental pilot symbols or the SINR of the HS-DSCH as previously described. The reliability analysis and pilot source selection unit 112c controls the selection circuit 112d that selectively outputs either the initial combining weights based on the primary pilot symbols, or the refined combining weights based on the supplemental pilot symbols to the HS-DSCH demodulation unit 104b. Those skilled in the art will appreciate that the selection circuit 112d illustrated in FIG. 5 is symbolic and may be implemented in software.

In order to conserve power, the use of supplemental pilot symbols for estimation may be triggered by predetermined events or at predetermined times. For example, the user terminal 100 may generate supplemental pilot symbols just prior to sending an HTTP request or other data on the uplink to which a response is anticipated. In some embodiments, the supplemental pilot symbols may be generated periodically or at scheduled times.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method implemented by a first user terminal for generating and using supplemental pilot symbols, said method comprising:
    demodulating a received signal containing unknown data symbols transmitted to at least one other user terminal to generate demodulated data symbols;
    determining a reliability metric for said demodulated data symbols; and
    generating a set of supplemental pilot symbols based on said demodulated data symbols if said reliability metric meets a predetermined reliability threshold.

2. The method of claim 1 wherein generating a set of supplemental pilot symbols from said demodulated data symbols comprises generating hard symbol estimates during demodulation from soft symbol estimates.

3. The method of claim 1 wherein generating a set of supplemental pilot symbols from said demodulated data symbols comprises decoding demodulated soft symbol estimates to generate a decoded bit stream and generating said supplemental pilot symbols from said decoded bit stream.

4. The method of claim 1 wherein said reliability metric comprises a signal to interference plus noise ratio (SINR) and wherein said reliability threshold comprises a predetermined SINR threshold.

5. The method of claim 1 further comprising determining said reliability threshold based on one or more transmission parameters associated with the received signal.

6. The method of claim 5 wherein determining said reliability threshold based on one or more transmission parameters associated with the received signal comprises determining said reliability threshold based on at least one of the spreading factor, modulation, number of spreading codes, and code rate for the received signal.

7. The method of claim 5 wherein the received signal is transmitted to another user terminal scheduled to receive the data on a shared traffic channel shared by a plurality of user terminals.

8. The method of claim 7 wherein determining said reliability threshold based on one or more transmission parameters associated with the received signal comprises decoding scheduling information transmitted to another scheduled user terminal over a shared control channel.

9. The method of claim 8 wherein the scheduling information is masked with a user identity of the scheduled user terminal, and wherein decoding scheduling information transmitted to the scheduled user terminal over a shared control channel comprises demasking the scheduling information.

10. The method of claim 9 wherein the scheduling information is transmitted in a two-part scheduling message having a first part masked with the user identity of a scheduled user terminal and a second unmasked part containing a check code corresponding to the user identity of the scheduled user terminal.

11. The method of claim 10 wherein demasking the scheduling information comprises decoding the second part of the scheduling message to extract the user identity of the scheduled user terminal, and decoding the first part of the scheduling message using the extracted user identity.

12. The method of claim 11 further comprising:
    demodulating said first part of said scheduling message;
    storing said demodulated symbols corresponding to said first part of said scheduling message while said second part of said scheduling message is decoded; and
    storing data symbols transmitted to another user on the shared traffic channel for later use in generating the supplemental pilot symbols.

13. The method of claim 11 further comprising storing the extracted user identity in a list for use in demasking later transmitted scheduling messages.

14. The method of claim 10 wherein demasking the scheduling information comprises decoding the scheduling information using a user identity stored in a list containing user identities of one or more other user terminals sharing the traffic channel with the first user terminal.

15. The method of claim 10 wherein demasking the scheduling information comprises:
    decoding the scheduling information with user identities stored in a list of user identities for one or more other user terminals sharing the traffic channel with the first user terminal;

if decoding with user identities in said list of user identities fails, decoding the second part of the scheduling message to extract the user identity of the scheduled user terminal; and decoding the first part of the scheduling message using the extracted user identity.

16. The method of claim 8 wherein the method is for a WCDMA system wherein the shared traffic channel comprises the High Speed Downlink Shared Channel (HS-DSCH) and wherein the shared control channel comprises the High Speed Shared Control Channel.

17. The method of claim 1 wherein the received signal is transmitted to a plurality of user terminals over a shared control channel.

18. The method of claim 1 further comprising determining at least one of channel estimates, covariance estimates, channel quality indication estimates, combining weights, or equalizer tap weights based on said supplemental pilot symbols.

19. A receiver for a user terminal in a wireless communication system, said receiver comprising:
a demodulator to demodulate a received signal transmitted to at least one other user terminal to generate demodulated data symbols;
a reliability metric estimator for determining a reliability metric for said demodulated data symbols; and
a pilot symbol generator to generate a set of supplemental pilot symbols from said demodulated data symbols having a reliability metric that meets a predetermined reliability threshold.

20. The receiver of claim 19 wherein said pilot symbol generator generates hard symbol estimates for use as supplemental pilot symbols from soft symbol estimates.

21. The receiver of claim 19 wherein said pilot generator generates supplemental pilot symbols from decoded data symbols.

22. The receiver of claim 19 wherein said reliability metric comprises a signal to interference plus noise ratio (SINR) and wherein said reliability threshold comprises a predetermined SINR threshold.

23. The receiver of claim 19 further comprising a reliability threshold calculator to determine the reliability threshold based on one or more transmission parameters associated with the received signal.

24. The receiver of claim 23 wherein the reliability threshold calculator determines the reliability threshold based on at least one of the spreading factor, modulation, number of spreading codes, and code rate for the received signal.

25. The receiver of claim 23 wherein the received signal is transmitted to another user terminal scheduled to receive data on a shared traffic channel shared by a plurality of user terminals.

26. The receiver of claim 25 further comprising a decoding circuit to decode scheduling information transmitted over a shared control channel to determine said transmission parameters.

27. The receiver of claim 26 wherein the scheduling information is masked with a user identity of the scheduled user terminal and wherein the decoding circuit is configured to demask said scheduling information.

28. The receiver of claim 27 wherein the scheduling information is transmitted in a two-part scheduling message having a first part masked with the user identity of a scheduled user terminal and a second unmasked part containing a check code corresponding to the user identity of the scheduled user terminal.

29. The receiver of claim 28 wherein the decoding circuit is configured to decode the second part of the scheduling message to extract the user identity of the scheduled user terminal, and to decode the first part of the scheduling the scheduling message using the extracted user identity.

30. The receiver of claim 29 wherein the decoding circuit is configured to demodulate the first part of the scheduling message, store the demodulated symbols corresponding to the first part of the scheduling message in a memory while said second part of the same scheduling message is decoded, and store data symbols transmitted to another user on the shared traffic channel for later use in generating the supplemental pilot symbols.

31. The receiver of claim 29 further comprising memory to store the extracted user identity in a list for use in demasking later transmitted scheduling messages.

32. The receiver of claim 28 wherein the decoding circuit is configured to decode the scheduling information using a user identity stored in a list containing user identities of one or more other user terminals sharing the traffic channel with the first user terminal.

33. The receiver of claim 28 wherein the decoding circuit is configured to:
decode the scheduling information with user identities stored in a list of user identities for one or more other user terminals sharing the traffic channel with the first user terminal;
if decoding with user identities in said list of user identities fails, decode the second part of the scheduling message to extract the user identity of the scheduled user terminal; and
decode the first part of the scheduling message using the extracted user identity.

34. The receiver of claim 26 wherein the receiver is configured for a WCDMA system wherein the shared traffic channel comprises the High Speed Downlink Shared Channel (HS-DSCH) and wherein the shared control channel comprises the High Speed Shared Control Channel.

35. The receiver of claim 19 wherein the received signal is transmitted to a plurality of user terminals over a shared control channel.

36. The receiver of claim 19 further comprising an estimation circuit for determining at least one of a channel estimate, covariance estimate, channel quality indication estimate, combining weights, or equalizer tap weights based on said supplemental pilot symbols from the pilot symbol generator.

* * * * *